Patented Dec. 17, 1946

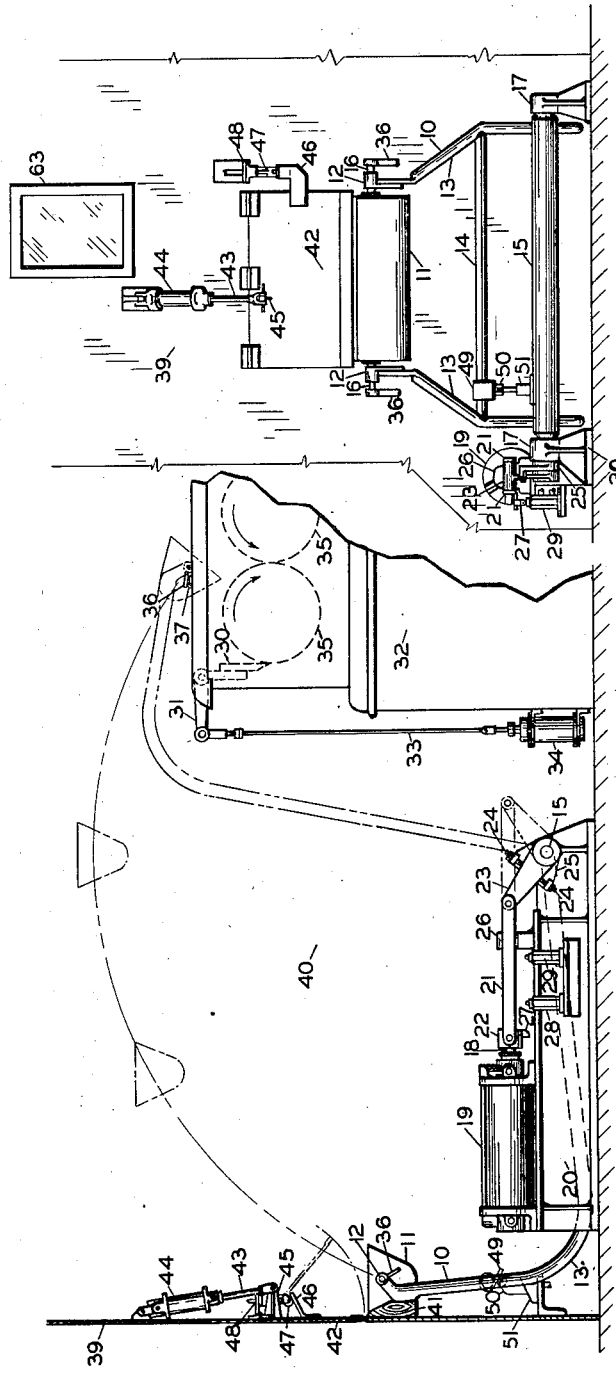

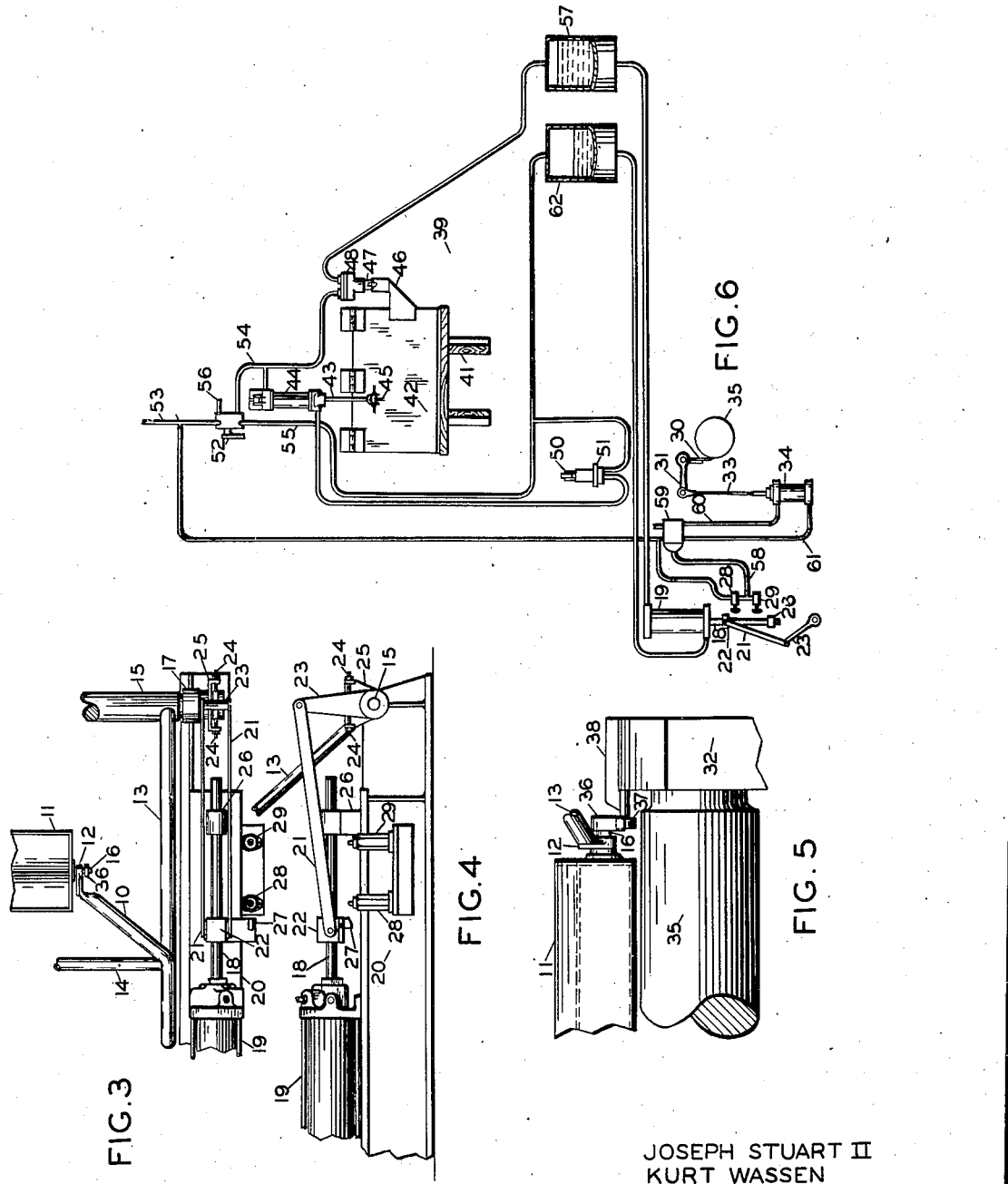

2,412,658

UNITED STATES PATENT OFFICE 2,412,658

CHARGING MECHANISM

Joseph Stuart, II, and Kurt Wassen, Wilmington, Del., assignors to Hercules Powder Company, Wilmington, Del., a corporation of Delaware Application December 17, 1945, Serial No. 635,575

8 Claims. (Cl. 18—2)

This invention relates to charging mechanism and, more particularly, to a mechanism for charging plastic materials to a rolling mill.

In the manufacture of smokeless powder, differential rolling is frequently used to form colloided sheets from mixtures such as those containing nitrocellulose and nitroglycerin. The mixture is dumped onto horizontally disposed heated differential rolls as a wet paste and rolled to bring about the formation of a colloided sheet on the faster roll. Colloided smokeless powder is also frequently rolled on even speed rolls to bring about better consolidation. In both of the above-mentioned hazardous operations, the operator has heretofore loaded the rolling mills by manually placing the charge in the bite of the rolls and stripped the rolled powder from the rolls by the manual operation of a doctor blade.

It is among the objects of the invention to provide a roll charging device which is loaded and controlled from a position remote from the rolls.

A further object is to provide a doctor blade automatically actuated in synchronism with the charging device.

A further object is to provide a device for handling plastic materials, particularly explosive materials, with a minimum of hazard to the operator.

Other objects of the invention will appear hereinafter, the novel features and combinations being set forth in the appended claims.

Generally described, the present invention comprises a charging trough, an automatically actuated safety loading door, a support for the charging trough, a mechanism for actuating the charging trough from the safety loading door to a position over the rolls and return, a charging trough tilting device, a power actuated doctor blade for removing rolled plastic material from the rolls, and interlocking controls for the actuation of the charging trough, the safety loading door and the doctor blade.

A preferred embodiment of the invention has been chosen for purposes of illustration and description and is shown in the accompanying drawings forming a part of the specification wherein like figures refer to like parts wherever they occur: Figure 1 is a fragmentary side elevation of the charging device and doctor blade unit; Figure 2 is a rear view with the rolls removed; Figure 3 is an enlarged fragmentary plan view of the charging trough frame driving mechanism; Figure 4 is an enlarged fragmentary side elevation of the charging trough frame driving mechanism; Figure 5 is an enlarged fragmentary front view of the rolls with the doctor blade removed showing the charging trough trip device; and Figure 6 is a schematic diagram illustrating the hydraulic and pneumatic systems for operating and controlling the charging device and the doctor blade.

In the drawings, a charging trough frame 10, pivotally supporting a charging trough 11 on integral trunnion bearings 12, is formed of arms 13 and cross brace 14. The arms 13 are rigidly secured to a drive shaft 15.

Trunnion shafts 16, rigidly secured to charging trough 11, are attached to said trough well above its center of gravity.

Drive shaft 15 is pivotally mounted on pillow blocks 17 and rotated through an arc by a linkage actuated by a piston rod 18 of a hydraulic cylinder 19 mounted on a structural framework 20. The linkage consists of a connecting rod 21 pivotally attached to a cross head 22 at one end and to a crank 23 at the other end. Cross head 22 is attached to the piston rod 18. Crank 23 is attached to drive shaft 15 in a manner to prevent movement in a horizontal direction parallel to the axis of said shaft while at the same time permitting axial movement about said axis within the limits allowed by adjustment screws 24 of the adjustable crank 25. Adjustable crank 25 transmits the movement of crank 23 to the drive shaft 15 and thus, by the proper setting of the adjustment screws 24, the point of loading and unloading of the charging trough 11 is readily adjustable. A bearing block 26 slidably retains the end of the piston rod 18 in correct alignment with the hydraulic cylinder 19. A projecting cam 27, pivotally affixed to the cross head 22, is positioned to actuate the plungers of the pilot valve 28 and relief pilot valve 29 in its course of travel in an outward direction and to swing to an inoperative position upon contact with the plungers on the return stroke. More detailed information as to the function of these valves in the control of a doctor blade 30 is brought out in the description of the various interlocking controls with reference to Figure 6. The doctor blade 30 is attached to a lever 31 in pivotal attachment to the framework of the rolling mill 32. The lever 31 is connected by an extended rod 33 to the piston of a cylinder 34 which provides automatically controlled movement to the doctor blade.

Tilting of the charging trough 11 to unload its contents onto the bite of rolls 35 is accomplished by trip levers 36 contacting trip rollers 37 as the charging trough assembly approaches the rolls 35. The trip levers 36 are securely attached to the trunnion shafts 16 and thereby transmit a tilting movement to the charging trough 11.

The trip rollers 37 are rotatably mounted on brackets 38 secured to the framework of the rolling mill 32 in a position to tilt the charging trough 11 at the desired angle over the rolls 35.

In the loading position, the charging trough 11 is adjacent to a wall 39 of a rolling chamber 40 and rests against a stop 41. While in this position a charging door 42 is opened, material to be rolled placed in the charging trough 11, and the charging door 42 again closed before further operations proceed. The various interlocking controls are hereinafter described with reference to Figure 6.

The charging door 42 is operated by movement of an air cylinder piston rod 43 of an air cylinder 44 which is in pivotal attachment to the wall 39 of the rolling chamber 40. The air cylinder piston rod 43 is pivotally attached to a bracket 45 on the charging door 42 which is hingedly attached to the upper edge of an opening in the wall 39. An operating lever 46 secured to the charging door 42 supplies the necessary lift to a plunger 47 of a cam-operated valve 48 to place said valve in the "open" position when the charging door 42 is closed.

Operating plate 49, rigidly attached to the cross brace 14, depresses a plunger 50 of a door control valve 51 to the "open" position when the charging trough 11 is in the position for loading.

In Figure 6, a schematic diagram of the hydraulic and pneumatic systems is shown. A manually-operated 4-way valve 52 is supplied with air from a pipe 53 and by manual adjustment air may be directed into either a loading pipe 54 or an unloading pipe 55. In either position, an exhaust pipe 56 functions to relieve the inoperative elements of the invention.

After a charge of plastic material has been placed in the charging trough 11 through the charging door opening by the operator, air pressure directed into the loading pipe 54 actuates the air cylinder piston rod 43 to close the charging door 42 and until said door is closed, the plunger 47 of the cam-operated valve 48 holds said valve in the "closed" position. At the instant the charging door 42 is closed, the cam-operated valve 48 is placed in the "open" position by contact of the plunger 47 with the operating lever 46 and thus air under pressure is allowed to build up a desired pressure head in a hydraulic reservoir 57 to actuate the piston rod 18 of the hydraulic cylinder 19 in an outward direction. The motion imparted to the piston rod 18 in this operation is transmitted in a manner already described to the charging trough 11 to bring said trough to the unloading position over the rolls 35.

Rolling of the charge deposited on the rolls is continued until the charge has been properly worked. The rolled plastic material is removed from the rolls by the doctor blade 30 as charging trough 11 approaches the loading position over the rolls. Depression of the plunger of the pilot valve 28 by the projecting cam 27 allows air pressure from the pipe 53 to enter pipe 58 and position the pilot-operated 4-way valve 59 to permit ingress of air pressure from pipe 53 through pipe 60 to the cylinder 34 whose extended rod 33 transmits movement to the lever 31 and therethrough to the doctor blade 30. The short interval in which the projecting cam 27 remains in contact with the plunger of the pilot valve 28 to allow passage of air under pressure into pipe 58 is sufficient to position the 4-way valve 59 and enable the air pressure to build up in the pipe 58. As the projecting cam 27 breaks contact with the pilot valve 28, air under pressure is locked in pipe 58, keeping the 4-way valve 59 in its proper position and thereby holding the doctor blade 30 in contact with the roll in order to remove the rolled plastic material. As the projecting cam 27 moves into contact with and depresses the plunger of the relief pilot valve 29, the air pressure in pipe 58 is released, pilot-operated 4-way valve 59 returns to a position to exhaust air pressure from pipe 60 and direct air through pipe 61 to the cylinder 34 and the doctor blade 30 is removed from contact with the rolls by the upward movement of the extended rod 33. The return of the doctor blade 30 to an inoperative position takes place immediately preceding the disposal of the contents of the charging trough 11 into the bite of the rolls 35.

The material stripped from the rolls by the doctor blade 30 falls onto a moving conveyor belt or tray (not shown) for removal from the vicinity of the rolls.

Air pressure directed into the unloading pipe 55 flows into a hydraulic reservoir 62 to build up a desired pressure head to actuate the piston rod 18 of hydraulic cylinder 19 in an inward direction. The motion thus imparted to the piston rod is transmitted, in a manner already described, to the charging trough 11 to bring said trough to the position adjacent the wall 39. With the return of the charging trough 11 to the loading position, the valve plunger 50 is depressed by the operating plate 49 to place the valve 51 in the "open" position. In this position, air is given ingress to the air cylinder 44 and the charging door 42 is opened, thereby permitting the placing of another charge in the charging trough.

A window 63 made of a shatterproof transparent material is mounted in a position convenient to the various controls used in the operation of the rolls and the charger described above so that the operator may note the progress of the functions taking place inside the rolling chamber 40.

The preferred embodiment of the invention as described above has been found to operate very satisfactorily in the charging of smokeless powder to differential speed rolls. In the performance of this hazardous operation, the operator is at no time exposed to the explosive action and intense heat of the powder when it is accidentally ignited while being rolled.

It will be understood, however, that this particular use is not necessarily the limit of its practical application. In this connection, mention is made of such uses where it is desirable to protect the operator from hazards, such as vapors, flying particles, dust, and the like.

This invention has distinct advantages, one being simplicity of control of the operation of the invention. Still another advantage is the protection afforded the operator in the rolling of explosive, highly inflammable, or other hazard-forming materials.

What we claim and desire to protect by Letters Patent is:

1. In a device for automatically charging rolls, the combination of a charging trough; a safety loading door; means for supporting the charging trough; means for actuating the charging trough from the safety loading door to a position over the rolls and return; means for tilting the charging trough over the rolls; means for opening and closing the safety loading door; and interlocking controls of the means for actuating the charging trough and the means for opening and closing the safety loading door.

2. The device according to claim 1 wherein said means for supporting the charging trough includes a closed frame formed of arms having integral charging trough trunnion support bearings at one end, a horizontal drive shaft secured at the opposite end, and cross bracing.

3. The device according to claim 1 wherein said means for actuating the charging trough includes a pressure-operated cylinder, the piston rod of which is connected by a linkage to a drive shaft of the support means.

4. The device according to claim 1 wherein said means for tilting includes a lever rigidly attached to each charging trough trunnion shaft and adapted to tilt the charging trough upon making contact with rollers mounted on brackets attached to the framework of the rolls.

5. The device according to claim 1 wherein said means for opening and closing the safety loading door includes a pressure-operated cylinder, the piston rod of which transmits motion through a linkage to said door.

6. In a device for automatically charging rolls, the combination of a charging trough; a safety loading door; a closed frame formed of arms having integral charging trough trunnion support bearings at one end and a horizontal drive shaft mounted on pillow blocks at the other end, said frame being adapted to support the charging trough; a pressure-operated cylinder with a piston rod connected by a linkage to the closed frame drive shaft and adapted to actuate the charging trough from the safety loading door to a position over the rolls and return; a pressure-operated cylinder with a piston rod connected by a linkage to the safety loading door to open and close said door; a lever rigidly attached to each trunnion shaft of the charging trough and adapted to tilt the charging trough upon making contact with rollers mounted on brackets attached to the framework of the rolls; and interlocking controls of the movement of the safety loading door and the charging trough by the pressure-operated cylinders.

7. In a device for automatically charging rolls, the combination of a charging trough; a safety loading door; means for supporting the charging trough; means for actuating the charging trough from the safety loading door to a position over the rolls and return; a doctor blade in juxtaposition to the rolls; means for tilting the charging trough over the rolls; means for automatically and synchronically operating the doctor blade; means for opening and closing the safety loading door; and interlocking controls of the means for actuating the charging trough, the means for automatically and synchronically operating the doctor blade, and the means for opening and closing the safety loading door.

8. In a device for automatically charging rolls, the combination of a charging trough; a safety loading door; a closed frame formed of arms having integral charging trough trunnion support bearings at one end and a horizontal drive shaft mounted on pillow blocks at the other end, said frame being adapted to support the charging trough; a pressure-operated cylinder with a piston rod connected by a linkage to the closed frame drive shaft and adapted to actuate the charging trough from the safety loading door to a position over the rolls and return; a doctor blade in juxtaposition to the rolls and adapted to be automatically actuated in synchronism with the movement of the closed frame by a pressure-operated cylinder; a pressure-operated cylinder with a piston rod connected by a linkage to the safety loading door to open and close said door; a lever rigidly attached to each trunnion shaft of the charging trough and adapted to tilt the charging trough upon making contact with rollers mounted on brackets attached to the framework of the rolls; and interlocking controls of the movement of the safety loading door, the doctor blade and the charging trough by the pressure-operated cylinders.

JOSEPH STUART, II.
KURT WASSEN.